UNITED STATES PATENT OFFICE.

MORITZ KÖRNER, OF GRÜNAU, GERMANY.

PROCESS FOR DEVULCANIZING INDIA-RUBBER.

953,094. Specification of Letters Patent. Patented Mar. 29, 1910.

No Drawing. Application filed November 2, 1905. Serial No. 285,637.

*To all whom it may concern:*

Be it known that I, MORITZ KÖRNER, chemist, a subject of the German Emperor, residing at Grünau, Germany, have invented a certain new and useful Process for Devulcanizing India-Rubber, of which the following is a specification.

The problem of completely removing the sulfur from vulcanized india-rubber, without in any way injuriously affecting its quality, has hitherto not been solved in a completely satisfactory manner.

The present invention has for its object to attain this result as completely as possible.

The process consists in heating the vulcanized india-rubber with media such as toluene, xylene or benzin, which dissolve india-rubber under pressure, at a high temperature and causing water or steam to act upon the solution obtained for a considerable time at a high temperature, the heating of the india-rubber with the india-rubber solvent being effected in the presence of water or steam under pressure, or the india-rubber solution being first relieved of loading substances and other admixtures and then heated with water or steam, preferably under pressure. After the aqueous layer has been separated from the india-rubber solution mechanically, the solvent is distilled off the latter, leaving behind the two components of vulcanized india-rubber i. e. caoutchouc and sulfur separated from each other. The india-rubber thus regenerated differs in no way from natural india-rubber as regards its property and can in particular be vulcanized again exactly like the latter. It dissolves easily in the ordinary india-rubber solvents and retains this property permanently. If the vulcanized india-rubber be heated under pressure with the solvents in the absence of water or steam, or if, where the operation had been carried out in the absence of water or steam, the subsequent treatment of the india-rubber solution with water or steam in the heat is omitted, a product results which is inferior in comparison with that obtained according to the present process, as it dissolves less easily in the ordinary solvents and its solubility in the latter gradually decreases.

*Examples.*

I. 100 kilograms of used bicycle tubes are heated with 500 kg. of benzin (or toluene or zylene) to 130–150° C. for 10 hours in a closed vessel, after which the solution obtained is heated with 50 kg. of water to 130° C. in a closed receptacle for 5 hours and then the rubber solution distilled to drive off the solvent.

II. 100 kilograms of bicycle tubes are heated with 500 kg. of benzin (or toluene or xylene) and 50 kg. of water for 10 hours in a closed vessel to 130–150° C. The solution obtained is then freed from the solvent in a suitable manner.

What I claim is:—

1. The improvement in the devulcanization of vulcanized india-rubber by treatment with india-rubber solvent at a high temperature and under pressure, which consists in adding to the said treatment a treatment with water not containing alkaline substances for several hours at a temperature above 100° C., substantially as described.

2. The herein described process for the devulcanization of vulcanized india-rubber by treatment with an india-rubber solvent at a high temperature and under pressure, which consists in heating 100 parts of vulcanized india-rubber with 500 parts of benzin and 50 parts of water in a closed receptacle to 130–150° C. for about 10 hours and then separating the solvent from the solution thus obtained, substantially as described.

In testimony whereof I have set my hand hereunto in the presence of two subscribing witnesses.

MORITZ KÖRNER.

Witnesses:
 CARL OEHLERT,
 FRITZ THOMAS.